United States Patent [19]

King

[11] Patent Number: 5,089,154
[45] Date of Patent: Feb. 18, 1992

[54] RECIRCULATING POWDER LUBRICANT DELIVERY SYSTEMS USING THERMALLY AND OXIDATIVELY STABLE SOLID LUBRICANTS

[75] Inventor: James P. King, Lansdale, Pa.

[73] Assignee: Desilube Technology, Inc., Lansdale, Pa.

[21] Appl. No.: 598,205

[22] Filed: Oct. 16, 1990

[51] Int. Cl.$^5$ .................................. C10M 103/02
[52] U.S. Cl. ............................... 252/28; 252/29; 252/49.3
[58] Field of Search .......... 252/28, 29; 428/402.24, 428/403, 404

[56] References Cited

U.S. PATENT DOCUMENTS

| | | | |
|---|---|---|---|
| 2,733,160 | 1/1956 | Iler | 117/16 |
| 3,242,075 | 3/1966 | Hunter | 252/29 |
| 3,454,513 | 7/1969 | Azarian | 260/23 |
| 3,969,232 | 7/1976 | Turner | 252/12 |
| 3,992,558 | 11/1976 | Smith-Johannsen et al. | 427/213 |
| 4,252,658 | 2/1981 | Tasaka et al. | 252/29 |

OTHER PUBLICATIONS

C.A. 75(8):580690—Abstr. of Ger. Pat. 1,644,927.
C.A. 98(12):92323g—Abstr. Pr. of Japan Kokai Appln. No. 81/45663, 30 Mar. 1981.

Primary Examiner—Jaqueline V. Howard
Attorney, Agent, or Firm—Paul Lipsitz

[57] ABSTRACT

Solid lubricants and a lubricating system having oxidative stability up to about 1500° F. (815° C.) comprising a solid lubricant selected from the group of molybdenum disulfide, graphite and a graphite fluoride having the formula $(CF_x)_n$ where x is from about 0.25 to about 1.25 and n is unknown, wherein the solid lubricant is characterized by being microencapsulated from an aqueous system with a thermally and oxidatively stable inorganic resin. Other embodiments of the invention comprise recirculating powder lubricant delivery systems using such microencapsulated lubricants and an encapsulated molybdenum disulfide pyrolyzed at a temperature of from about 400° to about 1000° C.

16 Claims, No Drawings

RECIRCULATING POWDER LUBRICANT DELIVERY SYSTEMS USING THERMALLY AND OXIDATIVELY STABLE SOLID LUBRICANTS

This invention relates to solid lubricants which have excellent oxidative stability, particularly at high temperatures, and which are used in recirculating powder lubricant delivery systems. More particularly, the invention provides a lubrication system for engines operating at very high and extremely high temperatures. The lubricant system of the invention will be useful for engines operating at temperatures of about 1500° F. (815° C.) such as engines having ceramic-to-ceramic contact.

BACKGROUND OF THE INVENTION

As with other types of engines, friction, wear and fracture of ceramic-to-metal and ceramic-to-ceramic interfaces must be controlled with lubricants. For advanced gas turbines, the operating temperatures can reach up to 1500° F. (815° C.) and use of conventional metals and liquid lubricants are not satisfactory. It has been recognized that the only choice of lubricants for such high temperature engines will be solid lubricants using a recirculating lubricant powder delivery system, but no solid lubricants are known to be readily available that will have the oxidative stability or other necessary properties needed at the high temperatures generated in the engines. For example, lead oxide and a $CaF_2$—$BaF_2$ eutectic mixture can be used in some applications up to about 1200° F. (650° C.), but at temperatures of about 930° F. (500° C.), they lose lubricity and exhibit high coefficients of friction. Similarly, graphite has good lubricating properties up to about 1100° F. (600° C.), but will oxidize rapidly above this temperature and, thus, cannot be used for extended periods at the high temperature.

Effective lubrication is also important at very low temperature and, thus, lubricants that are operable for extended periods of time over a very wide temperature range are extremely valuable. This invention provides lubricants and lubricating systems which have improved oxidative and thermal stability and low wear and friction properties. The lubricants and systems of the invention are operable over the temperature range of from about −60° F. up to about 1500° F. and are useful with engines using a recirculating lubricant powder delivery system.

BRIEF DESCRIPTION OF THE INVENTION

This invention provides lubricants and a lubrication system employing solid lubricants which have oxidative stability up to about 1500° F. The lubricants of the invention are solid lubricants selected from the group of molybdenum disulfide, graphite and a graphite fluoride wherein the solid lubricant is encapsulated from an aqueous system with a thermally and oxidatively stable inorganic resin exemplified by a polymeric alkali-metal silicate. The lubricating systems of the invention comprise a recirculating powder lubricant delivery system using the encapsulated solid lubricants.

DESCRIPTION OF THE PRIOR ART

The coating and microencapsulation of various solids is well known in the art. For example, U.S. Pat. No. 3,992,558 discloses the coating of particles, including carbon particles and graphite, of less than 20 microns in size with numerous types of organic polymers. U.S. Pat. No. 2,733,160 discloses dry lubricants such as graphite and molybdenum sulfide coated with estersils which are esters of an inorganic siliceous material with a primary or secondary alcohol. The so treated lubricants are said to have less tendency to aggregate and have more uniform covering power. U.S. Pat. No. 3,454,513 discloses the treating of metal powders, such as bronze powders, with a silicate solution to form a silica coating on the powder and thereby improve heat resistance and reduce tarnishing at temperatures of 500° F. and higher in hot processing with modern plastics. Japanese Kokai application 81/45663, Mar. 30, 1981 (CA 98 (12): 92323 g), discloses graphite encapsulated with glass or mixed with glass particles for the hot working of metals. German Patent DE 1644927 (CA 75(8): 58069u) discloses the mixing and fine grinding of a dry lubricant, such as molybdenum disulfide or graphite by stirring the lubricant into a resin solution or a silicate solution with SiC or $Al_2O_3$ particles which are mixed with lime water, $AlCl_3$ or $H_2SO_4$ to produce by double decomposition, difficulty soluble compounds, e.g., Al silicate. These particles are incorporated electrolytically into the metal coating of an article.

DETAILED DESCRIPTION OF THE INVENTION

As indicated, the invention embodies a recirculating lubricant delivery system and such systems are best known in advanced gas turbine engines where ceramic-to-metal and ceramic-to-ceramic surfaces must be lubricated. Such a system is described in NTIS Report No. APL-TR-65-43 by S. Wallerstein entitled "Application of a Powder Lubrication System to a Gas Turbine Engine." In the present invention, the solid lubricants which have the improved thermal and oxidative stability necessary for such systems are microencapsulated molybdenum disulfide, graphite and a graphite fluoride of the formula $(CF_x)_n$ where x is from 0.25 to a value somewhat greater than 1 and n is unknown. Graphite fluoride, also called poly(carbon monofluoride) is a known material described in the Journal of the American Society of Lubrication Engineers, May, 1972, p. 161-164. This material is also known as FLUOROGRAPHITE TM polymer (FLUOROGRAPHITE being a trademark of ATOCHEM). The value of x in the compound generally ranges from about 0.25 to about 1.25. The microencapsulation will be accomplished by spray drying with an aqueous silicate solution.

The microencapsulating agent used will be an alkali metal silicate (preferably sodium or potassium silicate) applied to the lubricant from an aqueous system. The silicate is effectively polymerized around the lubricant particle by the elimination of hydrogen and hydroxyl groups between molecules to form water. In this way, the lubricant particle is coated with a thermally and oxidatively stable polymeric inorganic resin.

In the spray drying technique, an aqueous solution of the silicate is diluted to a silicate concentration of about 1% to about 40% by weight before spray drying the lubricants. The resultant dry capsule will have a payload (i.e., the amount of resin on the final lubricant capsule) of from about 0.1% to about 50% by weight. Preferably, the aqueous silicate solution for spraying will be from about 10% to about 15% and the preferred payload will be from about 5% to about 20%.

Another embodiment of the invention is a molybdenum disulfide derivative obtained by pyrolyzing $MoS_2$ which has been micro-encapsulated with silicate at a temperature of from about 400° to about 1000° C. This material is of unknown composition, but has been characterized by x-ray diffraction and provides a useful high temperature solid lubricant.

EXPERIMENTAL DETAILS

The microencapsulated solid lubricants were subjected to high temperature test evaluations and wear tests for lubrication performance.

SPRAY DRYING TECHNIQUE

Graphite, molybdenum disulfide and graphite fluoride $(CF_x)_n$ where x is 1.1 were encapsulated with potassium silicate using a Buchi mini-sprayer (Model 190) to coat the samples. Potassium silicate (PQ's KASIL #1) was diluted from 29.1% to 11.64% concentration before spray drying the solid lubricants at an inlet temperature of 130° C. and an outlet temperature of 76° C. The atomizing air flow registered 600 ml./min. on a flow meter and the emulsion feed rate was 6 g/min. The resultant dry capsule theoretical payload was calculated to be 63.2% lubricant and 36.8% potassium silicate.

COMPARISON OF THERMAL STABILITIES OF ENCAPSULATED AND PLAIN SOLID LUBRICANTS

TGA curves were obtained in air up to 1000° C. on plain, unencapsulated $MoS_2$, graphite, and the graphite fluoride and the corresponding silicate encapsulated $MoS_2$, graphite and graphite fluoride. Comparison of the TGA curve of the plain $MoS_2$ with the encapsulated $MoS_2$ indicated significant improvement in the thermal stability of the encapsulated $MoS_2$ as indicated by 92.2% residual weight remaining at 1000° C. vs. 4.4% for the plain $MoS_2$. With graphite, the encapsulated form also showed good improvement, the plain graphite retaining only 14% of its original weight, whereas the encapsulated graphite retained 58%. With the graphite fluoride, the encapsulated material showed a residual weight of 68% whereas only 35% residue remained for the unencapsulated material at 1000° C.

HEAT TREATMENT OF PLAIN AND ENCAPSULATED GRAPHITE

This experiment was designed to determine the difference in the thermal and oxidative stabilities of the plain and encapsulated graphite. Graphite is a good subject for this test because of its inferior oxidative stability between 1100° F. (593° C.) and 1830° F. (1000° C.). Both the plain and silicate encapsulated graphite powders were cold pressed into 2.0×13.0 mm. round buttons on a hydraulic press at 8000 psi. Two buttons, one plain and one encapsulated, were placed in a preheated furnace at a selected temperature for one hour. Dimension and weight changes are recorded in Table 1. The encapsulated graphite buttons showed slight changes in dimension and were relatively constant in weight loss (20–22.5%) up to 1830° F. However, the plain graphite buttons disintegrated after heating and showed progressive increases in weight loss (30–85%) with increased temperature.

INVESTIGATION OF PYROLYSIS RESIDUES OF ENCAPSULATED $MoS_2$ AND GRAPHITE BY SEM-EDX/WDX AND X-RAY DIFFRACTION

A study of the pyrolyzed residues of the encapsulated $MoS_2$ and graphite by SEM-EDX/WDX (Energy Dispersed X-ray) and x-ray diffraction was made. The encapsulated $MoS_2$ and graphite were pyrolyzed in an oven at about 1000° C. until constant weights were obtained and were identified as follows:

A. Encapsulated $MoS_2$ heated at 1000° C. in air until constant weight: 72% residue B. Encapsulated $MoS_2$ after TGA analysis up to 1000° C.: 92% residue (10° C./min. in air)

C. Unheated encapsulated $MoS_2$

D. Encapsulated graphite heated at 1000° C. until constant weight: 63% residue

The EDX spectra of the above-mentioned samples, A, B and C were quite similar; the only noticeable difference being the strength of the overlapped Mo/S peak. WDX spectra, however, showed major difference in relative sulfur concentration. Sample C, as expected, showed major amount of sulfur, Sample B showed a small amount of sulfur (a few tenths of one percent), and Sample A showed major amount of sulfur.

Furthermore, the samples acted quite differently under the relatively high electron beam current required for WDX analysis. Sample A was stable, Sample B "bumped" and "jittered" extensively under the beam (almost as if it were randomly melting), and Sample C "bumped," but not nearly as much as B.

The x-ray diffraction of Sample D was identified as graphite. This indicates that graphite survived at 1000° C. in the encapsulated form. The x-ray diffraction pattern of Samples A and B were identical. Attempts to identify these products were not successful. None of the major lines matched molybdenum disulfide, various molybdenum oxides, metal molybdate or $SiO_2$. Thus they are novel compositions having excellent solid lubricant properties. The x-ray D-spaces and other related data of Sample A are listed in Table 4.

LUBRICATING PROPERTIES OF PLAIN AND ENCAPSULATED SOLID LUBRICANTS BEFORE AND AFTER PYROLYSIS

Pyrolysis of the plain and encapsulated solid lubricants were carried out in a furnace at 100° C. increments to 700° C. and held at that temperature for one hour. The percentages of weight loss of $MoS_2$ and encapsulated $MOS_2$ are recorded in Table 2. Improvement in the thermal stabilities of the encapsulated form in comparison with the plain solids is indicated by the lower weight loss after pyrolysis.

The powders of the plain and encapsulated solid lubricants before and after pyrolysis were incorporated into a lithium grease as additives at 3% concentration. The average wear scar diameters and coefficients of friction of these greases were determined on a Shell Four-Ball Wear Tester. The purpose of this test was an attempt to detect any adverse change occurring in these solid lubricants before and after pyrolysis and between the plain and encapsulated pairs. Although these results are not directly related to the lubricating properties of these materials functioning as high temperature solid lubricants, these tests will show the effect on abrasion, coefficients of friction, and wear of encapsulation using potassium silicate as the shell material. The wear and friction data as listed in Table 3 shows that the use of potassium silicate shell did not produce any significant adverse effect on wear, friction and abrasion.

TABLE 1

HEAT TREATMENT OF COLD PRESSED PLAIN AND ENCAPSULATED GRAPHITE BUTTONS

| Sample | Temp. °F. | Weight Change After Heat Treatment | | | | Dimension Change | |
|---|---|---|---|---|---|---|---|
| | | Initial Wt (g) | Final Wt | Weight Loss (g) | % Weight Loss | Before Heating mm | After Heating mm |
| Plain | 1100 | 0.490 | 0.340 | 0.150 | 30.6 | 2.0 × 13.0 | 2.0 × 13.5 |
| Encap. | 1100 | 0.490 | 0.380 | 0.110 | 22.4 | 2.0 × 13.0 | 1.9 × 12.9 |
| Plain | 1300 | 0.500 | 0.180 | 0.320 | 64.0 | 2.0 × 13.0 | disintegrated |
| Encap. | 1300 | 0.490 | 0.380 | 0.110 | 22.4 | 2.0 × 13.0 | 1.9 × 12.9 |
| Plain | 1400 | 0.500 | 0.130 | 0.370 | 74.0 | 2.0 × 13.0 | disintegrated |
| Encap. | 1400 | 0.490 | 0.380 | 0.110 | 22.4 | 2.0 × 13.0 | 1.8 × 12.9 |
| Plain | 1500 | 0.400 | 0.080 | 0.320 | 80.0 | 2.0 × 13.0 | disintegrated |
| Encap. | 1500 | 0.500 | 0.400 | 0.100 | 20.0 | 2.0 × 13.0 | 1.8 × 12.8 |
| Plain | 1830 | 0.480 | 0.070 | 0.410 | 85.0 | 2.0 × 13.0 | disintegrated |
| Encap. | 1830 | 0.480 | 0.380 | 0.100 | 20.5 | 2.0 × 13.0 | 1.3 × 12.3 |

TABLE 2

PYROLYSIS OF PLAIN AND ENCAPSULATED SOLID LUBRICANTS AT 700° C. FOR ONE HOUR IN AIR

| Composition | % Wt. Loss |
|---|---|
| $MoS_2$ | 12.8 |
| Encap. $MoS_2$ [1] | 10.9 |

[1] Encapsulated $MoS_2$ was encapsulated to a payload of 36.8% with potassium silicate by spray drying technique.

TABLE 3

LUBRICATING PERFORMANCE OF PLAIN AND ENCAPSULATED SOLID LUBRICANTS AS ADDITIVES IN LITHIUM GREASE

| Lithium Grease Containing 3% Solid Lubricant | Lubricating Properties [1] | | | |
|---|---|---|---|---|
| | Before Pyrolysis | | After Pyrolysis | |
| | Ave. Wear Scar | Coeff. Frict. | Ave. Wear Scar | Coeff. Frict. |
| Graphite | 0.77 | 0.026 | — | — |
| Encap. Graphite | 0.74 | 0.028 | — | — |
| $MoS_2$ | 0.54 | 0.064 | 0.49 | 0.017 |
| Encap. $MoS_2$ | 0.62 | 0.072 | 0.57 | 0.093 |
| Base Grease (no additive) | 0.80 | 0.072 | — | — |

[1] ASTM D 2266: 1200 rpm, 40 kg, 75° C. for 1 h (AISI-52100 balls)

TABLE 4

X-RAY DIFFRACTION DATA ON PYROLYSIS RESIDUE OF ENCAPSULATED $MoS_2$ AFTER TREATMENT AT 1000° C. IN AIR
START 2THETA: 5.000  STOP 2THETA: 150.000
STEP SIZE: 0.050  SCAN SPEED: 10.000
KV: 45  MA: 35
PEAK FINDING PARAMETERS
THRESHOLD VALUES: 5.0, 10.0
RELATIVE CUTOFF INTENSITY: 4.0
TYPICAL FULL WIDTH-HALF MAXIMUM: 1.00
MINIMUM FULL WIDTH-HALF MAXIMUM: 0.30
ALPHA 2 REMOVAL USING CODE: 1

| PEAK | 2-THETA | D-SPACE | I (REL) | I (CPS) | FWHM |
|---|---|---|---|---|---|
| 1 | 11.300 | 7.8242 | 18.91 | 715.6 | 0.617 |
| 2 | 15.200 | 5.8243 | 10.26 | 388.1 | 0.618 |
| 3 | 17.600 | 5.0351 | 10.67 | 403.7 | 0.360 |
| 4 | 19.000 | 4.6671 | 11.93 | 451.5 | 0.610 |
| 5 | 20.700 | 4.2875 | 4.97 | 187.9 | 1.000 |
| 6 | 21.900 | 4.0552 | 43.84 | 1658.7 | 0.616 |
| 7 | 23.300 | 3.8146 | 10.94 | 414.1 | 0.580 |
| 8 | 27.500 | 3.2408 | 100.00 | 3783.4 | 0.659 |
| 9 | 28.950 | 3.0817 | 18.05 | 683.0 | 0.568 |
| 10 | 30.550 | 2.9239 | 5.47 | 206.9 | 0.930 |
| 11 | 32.850 | 2.7242 | 7.62 | 288.5 | 0.617 |
| 12 | 35.950 | 2.4961 | 5.27 | 199.6 | 1.242 |

TABLE 4-continued

X-RAY DIFFRACTION DATA ON PYROLYSIS RESIDUE OF ENCAPSULATED $MoS_2$
AFTER TREATMENT AT 1000° C. IN AIR
START 2THETA: 5.000  STOP 2THETA: 150.000
STEP SIZE: 0.050  SCAN SPEED: 10.000
KV: 45  MA: 35
PEAK FINDING PARAMETERS
THRESHOLD VALUES: 5.0, 10.0
RELATIVE CUTOFF INTENSITY: 4.0
TYPICAL FULL WIDTH-HALF MAXIMUM: 1.00
MINIMUM FULL WIDTH-HALF MAXIMUM: 0.30
ALPHA 2 REMOVAL USING CODE: 1

| PEAK | 2-THETA | D-SPACE | I (REL) | I (CPS) | FWHM |
|---|---|---|---|---|---|
| 13 | 37.500 | 2.3964 | 4.26 | 161.1 | 0.377 |
| 14 | 38.600 | 2.3306 | 6.04 | 228.4 | 0.642 |
| 15 | 42.650 | 2.1182 | 13.16 | 498.0 | 0.725 |
| 16 | 46.550 | 1.9494 | 6.34 | 239.8 | 0.682 |
| 17 | 47.700 | 1.9051 | 4.64 | 175.7 | 1.245 |
| 18 | 48.400 | 1.8791 | 4.21 | 159.3 | 1.146 |
| 19 | 52.600 | 1.7385 | 8.85 | 334.9 | 0.612 |
| 20 | 69.050 | 1.3591 | 6.14 | 232.2 | 0.632 |

As can be seen from the above data, the microencapsulation of the powdered lubricants in accord with the invention enhances thermal and oxidative stability and makes possible their use in recirculating powder lubricant delivery systems. Such systems are particularly important where lubrication of ceramic-to-metal and ceramic-to-ceramic interfaces are required, as in high temperature engines. Thus, the invention makes a significant contribution to such very high temperature lubricants and to very high temperature engine systems.

The encapsulated compositions of the invention have other applications as well. For example, they may be used as lubricants for brake linings, for hot forging of steel, and for other applications as will become apparent to the skilled art worker.

I claim:

1. A solid lubricant having oxidative stability to about 1500° F. comprising a solid lubricant selected from the group of molybdenum disulfide, graphite and a graphite fluoride of the formula $(CF_x)_n$ where x is from about 0.25 to greater than 1 and n is unknown, wherein said solid lubricant is microencapsulated from an aqueous system with an alkali metal silicate.

2. A lubricant of claim 1 wherein the alkali metal silicate on said encapsulated lubricant is from about 0.1% to about 50% by weight.

3. A lubricant of claim 2 wherein the solid lubricant is graphite and the silicate is coated on the solid lubricant in an amount from about 5% to about 20% by spray drying an aqueous silicate solution on said lubricant.

4. A lubricant of claim 2 wherein the solid lubricant is molybdenum disulfide and the silicate is coated on the solid lubricant in an amount of from about 5% to about 20% by spray drying an aqueous silicate solution on said lubricant.

5. The lubricant of claim 2 wherein the solid lubricant is a graphite fluoride of the formula $(CF_x)_n$ where x is from about 0.25 to about 1.25.

6. The lubricant of claim 5 wherein x is about 1.1.

7. A recirculating powder lubricant delivery system having an oxidative stability up to about 1500° F. wherein said recirculating lubricant is a solid lubricant selected from the group consisting of molybdenum sulfide, graphite and a graphite fluoride of the formula $(CF_x)_n$ where x is from about 0.25 to about 1.25 and n is unknown, wherein said solid lubricant is microencapsulated with an alkali metal silicate.

8. The lubricant system of claim 7 wherein the alkali metal silicate on said encapsulated lubricant is from about 0.1% to about 50% by weight.

9. The lubricant system of claim 8 wherein the solid lubricant is graphite and the silicate is coated on said solid lubricant in an amount from about 5% to about 20% by spray drying an aqueous silicate solution on said lubricant.

10. The lubricant system of claim 8 wherein the solid lubricant is molybdenum disulfide and the silicate is coated on said solid lubricant in an amount from about 5% to about 20% by spray drying an aqueous silicate solution on said lubricant.

11. The lubricant system of claim 8 wherein the solid lubricant is a graphite fluoride of the formula $(CF_x)_n$ where x is from about 0.25 to about 1.25 and n is unknown, wherein said lubricant is coated with said silicate in an amount from about 5% to about 20% by spray drying an aqueous silicate solution on said lubricant.

12. The lubricant system of claim 11 wherein the value of x is about 1.1.

13. A high temperature solid lubricant which consists of molybdenum disulfide microencapsulated with an alkali metal silicate and pyrolyzed at a temperature of from about 400° to about 1000° C.

14. The lubricant of claim 13 wherein said molybdenum disulfide is microencapsulated by spray drying with an aqueous alkali metal silicate solution.

15. The lubricant of claim 14 wherein the silicate solution is a sodium silicate solution.

16. The lubricant of claim 14 wherein the silicate solution is a potassium silicate solution.

* * * * *